Patented Sept. 29, 1925.

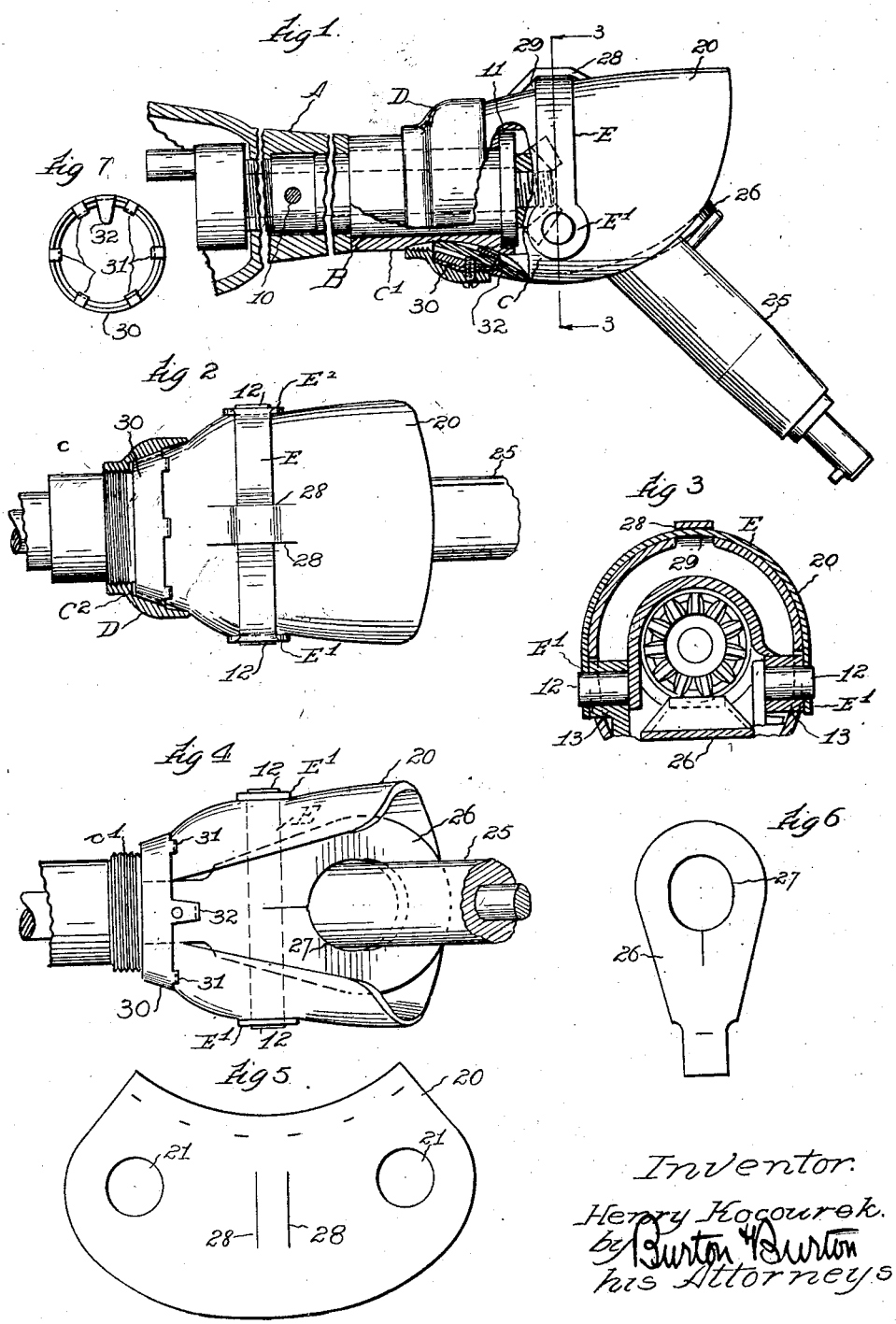

1,555,220

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS.

SHEATH FOR SWIVEL-GEAR JOINTS.

Application filed December 15, 1924. Serial No. 756,079.

*To all whom it may concern:*

Be it known that I, HENRY KOCOUREK, a citizen of the United States, residing in the city of Chicago, in the county of Cook and the State of Illinois, have invented certain new and useful Improvements in Sheaths for Swivel-Gear Joints, of which the following is a specification, reference being had to the accompanying drawings, forming a part thereof.

The purpose of this invention is to provide an improved construction of a sheath for protecting and guarding the hand of the operator in respect to the swivel gear joint of a power-operated animal shear. It consists in the elements and features of construction shown and described as indicated in the claims.

In the drawings:

Figure 1 is a partly sectional side elevation of the portion of the animal shears comprising the swivel gear joint constructed and equipped with the sheath for the joint in accordance with this invention.

Figure 2 is a top plan view of the same.

Figure 3 is a section at the line 3—3 on Figure 1.

Figure 4 is a bottom or underside plan view of the same parts.

Figure 5 is a plan of a blank from which the main element of the sheath is formed.

Figure 6 is a plan view of the supplemental part of the sheath.

Figure 7 is a detail plan view of a ferrule for uniting the two elements of the sheath and holding them in the form encompassing the joint.

The drawings show the portion of a power-operated animal shear comprising the flexible or swivel gear joint to which, for protecting said joint, a sheath embodying the invention is applied. In the drawings the rear end portion of the body or handle of the tool is seen at A. Protruding from the rear end of the body, A, a bushing forming the journal bearing for the operating shaft is seen at B. This journal bearing bushing is removable from the body for convenience of assembling the parts, being held rigid therewith when assembled by a set screw, 10. At the rear end of the journal bushing, B, it has a terminal radially projecting flange 11, and on the projecting portion of the bushing between this flange and the rear of the body there is mounted and swiveled by means of its sleeve stem, $C^1$, the forward member of the swivel gear joint, C. The rear member of said joint is seen at D, the two members being pivoted together in the usual manner as seen in Figure 3 by means of the pintles, 12, 12, of the rear member engaging the pivot eyes, 13, 13, of the forward member, the parts being constructed for assembling in a familiar manner requiring no description for the purpose of this invention. It will be noted, however, that the pintles, 12, 12, are of such length as to project slightly from the eyes, 13, 13, at the opposite sides of the joint for the purpose hereinafter stated.

For guarding the joint a sheath preferably made of heavy leather or like tough, flexible, non-metallic material is formed in the two members, the main member, 20, being made from a blank of general sectoral form shown in Figure 5, adapted to be flexed to enwrap the joint as seen in Figures 1, 2, 3 and 4, said blank having apertures, 21, 21, positioned for engaging the pintles, 12, 12, when the blank is flexed about the joint as most clearly seen in Figure 3. This member, 20, is dimensioned for completely enwrapping the joint except as to a gap at the underside necessary to accommodate the movement of the journal bearing of the inleading power-shaft, indicated at 25, in the flexing of the joint. This gap is occupied by a tongue member, 26, of the same material as the member, 20, having an aperture, 27, through which the journal bearing, 25, protrudes, the said tongue lapping preferably inside the margins of the member, 20, at opposite sides of the gap as seen in Figure 4. For holding the sheath fixedly in form encompassing and protecting the joint there is provided a metal ferrule, 30, which is clinched as indicated by the clinching lugs, 31, 31, onto the lesser circumferential edge of the sheath member, 20, when the same is folded for enwrapping the joint, the end of the tongue member, 25, opposite that through which the aperture, 26, for the power shaft journal bearing is formed being also engaged with the ferrule by means of a clinching lug, 32, as seen in Figures 1 and 4. The swiveling sleeve stem, $C^1$, of the joint member, C, has at its rear end a boss, $c^1$, which is exteriorly threaded. The ferrule, 30, is diametered interiorly for passing onto the sleeve, $C^1$, and being admitted over the threaded boss, stopping against the shoulder, C², of the joint member forward of the joint, whereby the sheath is stopped rearwardly. For stopping the sheath forwardly there is provided a second ferrule member, D, interiorly threaded for engaging the thread of the boss, C, and flared from its interiorly threaded hub to pass over and encompass and clamp the ferrule, 30. For holding the sheath in properly flexed form about the joints without lacing or otherwise securing together the lapping edges of the member, 20, and the tongue, 25, there is provided a spring metal clasp, E, having terminal eyes, E¹, for engaging the protruding ends of the pintles, 12, outside the engagement of the sheath member, 20, with said pintles at the apertures, 21. For checking this clasp as against pivotal movement about the pintles the sheath member, 20, is slitted as seen at 28, 28, forming a loop or eye, 29, the slits being of suitable length to permit the insertion of the clasp, E, therethrough as seen in Figures 1 and 2, the loop or eye, 29, thereby constituting a check for the clasp at its middle point.

I claim:

1. In a power-operated animal shear and the like in combination with parts forming the swivel gear joint at the entrance of the power shaft, a sheath for said joint consisting of flexible, non-metallic sheet material comprising a member of general sectoral form flexed to encompass the joint except as to a gap for accommodating the annular movement of the inleading power shaft with respect to the body, and a tongue of like material occupying said gap, said tongue having an aperture for the inleading power shaft journal bearing; a ferrule to which the sectoral member at its lesser circumferential edge, and the tongue at the end opposite the shaft bearing aperture, are secured for maintaining the form of the sheath for encompassing the body member at its neck, and a spring metal clasp applied outside the sectoral member engaging the protruding ends of the pivoted pintles of the joint.

2. In the construction defined in claim 1, foregoing, means engaging the clasp with the sheath intermediate the pivotal engaging ends of said clasp to prevent pivotal movement of the clasp about said pintles.

3. In a power-operated animal shear and the like in combination with parts forming the swivel gear joint at the entrance of the power shaft, a sheath for said joint consisting of flexible, non-metallic sheet material comprising a member of general sectoral form flexed to encompass the joint except as to a gap for accommodating the annular movement of the inleading power shaft with respect to the body, and a tongue of like material occupying said gap, said tongue having an aperture for the inleading power shaft journal bearing; a ferrule to which the sectoral member at its lesser circumferential edge and the tongue at the end opposite the shaft bearing aperture are secured for maintaining the form of the sheath for encompassing the body member at its neck, one member of the gear joint having a sleeve stem by which it is swiveled on the journal bearing, in the body, of the operating shaft, said sleeve stem being diametered for admitting over it the ferrule and sheath secured thereto, and means for making the ferrule fast on said sleeve stem.

4. In the construction defined in claim 3, foregoing, the sleeve stem having a protruding threaded annular boss and a second ferrule-like member diametered for passing over the sleeve stem and interiorly threaded for screwing onto the threaded boss following the first mentioned ferrule member, for clamping the latter fixedly on said member of the gear joint.

In testimony whereof, I have hereunto set my hand at Chicago, Illinois, this 9th day of December, 1924.

HENRY KOCOUREK.